Oct. 11, 1966     J. A. FINNERAN ET AL     3,278,398
RECOVERY OF GLYCERINE BY PLURAL STAGE DISTILLATION
Filed July 25, 1962
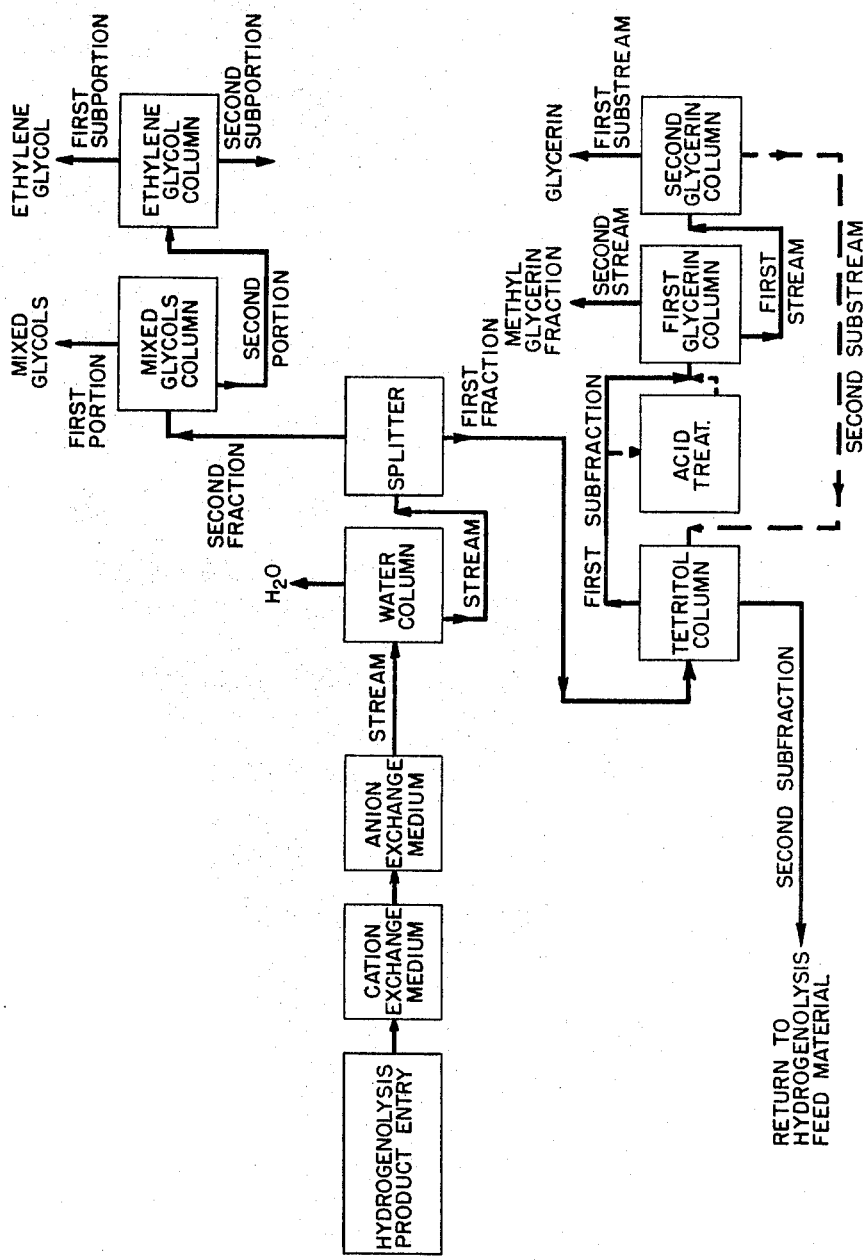
INVENTORS
James A. Finneran
Sidney M. Frank
Douglas H. Martin
BY

United States Patent Office 3,278,398
Patented Oct. 11, 1966

3,278,398
RECOVERY OF GLYCERINE BY PLURAL
STAGE DISTILLATION
James A. Finneran, Garden City, N.Y., and Douglas H. Martin, Harrington Park, and Sidney M. Frank, Chatham, N.J., assignors to Atlas Chemical Industries, Inc., Wilmington, Del., a corporation of Delaware
Filed July 25, 1962, Ser. No. 212,276
9 Claims. (Cl. 203—35)

The present invention relates to the resolution of a mixture of polyhydroxy compounds and is particularly adapted to the separation and recovery of components from a reaction mixture resulting from hydrogenolysis of saccharidic material.

Hydrogenolysis, the splitting of a molecule with a simultaneous addition of hydrogen to each of the fragments, of saccharidic material produces a variety of alcohols and a variety of residue materials having a lower molecular weight than the starting material. Various processes for the hydrogenolysis of saccharidic materials are known, for example, those described in the following U.S. Patents, Lolkema, 2,609,398; Du Puis, 2,282,603; Hanford, 2,209,055; and, Mueller et al., 1,990,245. The product of such processes is a mixture which contains a high percent of polyhydric alcohols, generally of a lower molecular weight than the starting material, for example, starting materials such as dextrin, starch, and glucose yield products such as, sorbitol, mannitol, glycerin, propylene glycol, and ethylene glycol. The hydrogenolysis product also contains small amounts of residue materials which are undefined products of degradation and transformation reactions occurring during hydrogenolysis. Separation of the various components of a hydrogenolysis process into pure, or relatively pure, products suitable for marketing is extremely difficult because many of the components are similar in chemical structure and share a narrow boiling point range. The difficulties usually encountered in separating the various components into pure products is compounded by the minor amounts of undesired residue materials, many of which are carried through the separation process and contaminate an otherwise separate and pure polyhydric alcohol component.

In accord with the present invention a process is provided for the separation of a reaction mixture resulting from the hydrogenolysis of saccharidic material into various and useful organic components. The hydrogenolysis product is initially distilled under conditions that a first fraction made up principally of components having boiling points equal to and above glycerin is separated from a second fraction made up principally of components having boiling points below glycerin. Frequently it may be desirable to utilize a starting product substantially free of ionizable materials which might interfere with the various distillation separations, and in such case, the hydrogenolysis product may suitably be passed through one or more ion exchange materials prior to separating the hydrogenolysis product into components. Also, if desired, a preliminary distillation of the hydrogenolysis product may be made to separate water from the hydrogenolysis product and thereby reduce the volume of hydrogenolysis product to be carried through the separation process.

The first fraction made up principally of components having boiling points equal to and above glycerin is subjected to a second distillation which separates a subfraction made up principally of components having boiling points equal to and below glycerin. If a high purity glycerin product is desired this subfraction may be treated with acid to convert polyol components having boiling points close to glycerin into compounds which may be separated from glycerin by distillation. Preferably the acid treatment is carried out as a batch process wherein from about 0.01% to about 2.5% by weight of sulfuric acid is mixed with the subfraction and the mixture heated to between about 130° C. and about 180° C. for a period of between about 1 and about 12 hours. The acid is then neutralized or removed by ion exchange and the acid-treated subfraction continued on its way through the separation process.

The subfraction made up principally of components having boiling points equal to and above glycerin is next treated by a third distillation to separate a first stream made up principally of components having boiling points equal to and above glycerin and a second stream up principally of components having boiling points below glycerin. The first stream is a substantially pure glycerin product and may be utilized for commercial use. The second stream may be recovered as a mixed polyol product.

If a high purity glycerin product is desired the first stream from the preceding distillation may be further treated by distillation to separate a first substream made up of a high purity glycerin product and a second substream principally containing any components having a boiling point above glycerin. The second substream from the latter separation may be utilized as feed material in the above-described second distillation.

The second fraction from the initial distillation described above, made up principally of components having boiling points below glycerin, may be subjected to a distillation to separate a first portion made up principally of components having boiling points below ethylene glycol and a second portion made up principally of components having boiling points equal to and above ethylene glycol. The first portion, made up principally of propylene glycol, is suited to recovery and marketing as a mixed glycols product. If desired the first portion, the mixed glycols product, may be distilled to separate propylene glycol from the mixture. The second portion, made up principally of components having boiling points equal to and above ethylene glycol, is subjected to distillation to separate a first subportion made up substantially of ethylene glycol and a second subportion, a mixed polyol product made up principally of materials boiling above ethylene glycol but below glycerin. The second subportion may be discarded or recovered as a separate mixed polyol product, but also may be conveniently added to the second stream from the preceding third distillation. The latter second subportion contains a high proportion of methyl glycerin as compared to other components and hereinafter will be referred to as the methyl glycerin fraction.

The present separation can best be described by reference to the accompanying drawing which is a flow sheet of a separation process in accord with the present invention. The hydrogenolysis product stream free of any undissolved solids, enters the process at the point indicated Hydrogenolysis Product Entry. If the hydrogenolysis product contains ionizable impurities, the product may initially be passed through an ion exchange unit to remove such impurities. If such preliminary treatment is utilized, it is preferred that the stream be passed through a cation exchanger and an anion exchanger mounted in series. Hydrogenolysis of polyhydroxy materials frequently yields a product containing a relatively high percentage of water and materials having boiling points equal to or below water. Water may also be added to the hydrogenolysis product stream to facilitate passage of the stream through an ion exchange treatment. It is preferred that the hydrogenolysis product stream be treated by distillation in an evaporation chamber or column to remove the excess water prior to separation of the stream into various organic components. Initial removal of excess water from the hydrogenolysis product stream lessens the amount of material which is passed on to be separated by a later step in the separation scheme.

After the steps of distillation to remove water, if such a step is used, a first distillation separation of the hydrogenolysis product stream into organic components is conducted so as to separate the stream into two fractions, a first fraction made up principally of components having boiling points equal to or above that of glycerin, and a second fraction made up principally of components having boiling points below that of glycerin. This separation preferably takes place in an evaporation chamber or column and is indicated in the accompanying flow sheet as the Splitter.

The first fraction from the Splitter, that made up principally of components having boiling points equal to and above tht of glycerin, is treated by distillation in an evaporation chamber or column to separate a first subfraction made up principally of components having boiling points equal to and below that of glycerin and a second subfraction made up principally of components having boiling points above that of glycerin. This separation step as shown in the flow sheet takes place in the Tetritol Column. The second subfraction, generally containing polyols and carbohydrate materials having four or more carbon atoms to the molecule, may suitably be returned and utilized as a feed material in the hydrogenolysis process.

The first subfraction from the Tetritol Column, that made up principally of components having boiling points equal to or below that of glycerin is next treated by distillation in an evaporation chamber or column to separate a first stream containing substantially pure glycerin and a second stream made up principally of components having boiling points below that of glycerin. This separation step, as shown in the flow sheet, takes place in the Frst Glycerin Column. Glycerin from the first stream may be recovered as a glycerin product. The second stream may be discarded; however, it is preferred, for economic reasons, that the material in the second stream be recovered as a portion of the methyl glycerin fraction. This stream generally contains a high (usually between about 70 and 80) percent by weight of 1, 2, 3-butanetriol with some glycerin and some ethylene glycol along with other materials present in the hydrogenolysis product which have boiling points near 1, 2, 3-butanetriol.

In some cases it may be desirable to produce a high purity glycerin. For example, a glycerin product suited to use in the manufacture of nitroglycerin must be substantially free of minor amounts of butanetriols, hexanetriols and hydroxylated tetrahydrofuran derivatives in order to obtain a product having an acceptable stability for the hazardous nitration process. To produce a purified glycerin product, the first subfraction from the Tetritol Column is treated with sulfuric acid and the acidified mixture heated to a temperature of between about 130 and 180° C. for a period of between about 1 and about 12 hours to substantially convert compounds other than glycerin to a more volatile form. The mixture is then neutralized. The neutralization may be accomplished by any suitable manner as by the addition of an alkali metal hydroxide, or by cooling and treatment by an anion exchange medium. It is preferred to utilize an ion exchange medium as by this method the formation of salts in the glycerin product is avoided. The neutralized mixture is then subjected to a distillation to separate a glycerin product. This distillation takes place in the First Glycerin Column. Preferably the First Glycerin Column separates a first stream made up principally of components having a boiling point equal to or above glycerin and suited for further treatment in the Second Glycerin Column, and a second stream made up principally of components having a boiling point below that of glycerin, which may be discarded, but is preferably recovered. Suitably the latter mentioned second stream may be recovered as a portion of the methyl glycerin fraction. The Second Glycerin Column separates the first stream from the First Glycerin Column into a first substream containing a high purity glycerin product and a second substream principally containing components having boiling points above glycerin. The second substream may be discarded; however, it is preferred, for economic reasons, that the second substream be cycled and fed into the Tetritol Column. This arrangement is shown in the flow sheet as a dashed line extending from the Second Glycerin Column to the Tetritol Column.

The second fraction separated by the distillation carried out in the Splitter, that fraction made up principally of components having a boiling point below glycerin, is suited to further treatment by distillation to separate a first portion made up principally of components having a boiling point below that of ethylene glycol and a second portion made up principally of components having a boiling point equal to or above that of ethylene glycol. This distillation takes place in the Mixed Glycols Column, shown in the accompanying flow sheet.

The first portion from the Mixed Glycols Column, that portion made up principally of components having a boiling point below ethylene glycol, may be recovered and utilized as a mixed glycol product. Generally, the mixed glycol product contains a high percentage of propylene glycol (between about 70 and about 80% by weight) and if desired, may be further treated by a suitable process, for example, further distillation, to separate a purified propylene glycol product.

The second portion from the Mixed Glycols Column, that portion made up principally of components having a boiling point equal to or above ethylene glycol is treated by distillation in an evaporation chamber or column to separate and recover a first subportion comprised essentially of ethylene glycol, and a second subportion which is small in total quantity and is a highly complex mixture of polyols including minor amounts of ethylene glycol and glycerin. The second subportion may be discarded or recovered as a separate mixed polyol product, but is conveniently added to the second stream from the first glycerin column. Suitably the second subportion may be recovered as a portion of the methyl glycerin fraction. This separation takes place in the Ethylene Glycol Column, shown in the flow sheet.

The individual distillation steps of the present separation and recovery process may be carried out under a variety of temperature and pressure conditions without disrupting the order of separation. The following example shows the separation of a typical hydrogenolysis product, a mixture of polyols and water into useful components by the present invention. It may be better understood by reference to the accompanying flow sheet:

*Example*

A nickel-catalyzed hydrogenolysis product of invert sugar and recycled materials referred to hereinafter was filtered to remove undissolved solids, diluted with water, and passed through an anion and a cation exchange medium to rid the product of undesired ionizable impurities. At this point the hydrogenolysis product contained the following major components, in the order of increasing boiling points: water, 2,3-butanediol, propylene glycol, 1,2-butanediol, ethylene glycol, 1,2,3-butanetriol, glycerin, 1,2,4-butanetriol, tetritols and hexitols. The hydrogenolysis product was then distilled to remove substantially all of the water in a Water Column. The Water Column was equipped with distillation trays and was operated at temperatures up to 230° C. and slightly above atmospheric pressure.

After removal of the water, the hydrogenolysis product was treated by distillation in a Splitter. The Splitter was a column, equipped with distillation trays, and was operated under a pressure in the top portion of the column of about 100 mm. of Hg absolute and at a temperature in the bottom portion of the column of up to 230° C. Open steam was fed into the bottom portion of the column to maintain sufficient bottom pressure. The reflux ratio was adjusted to obtain a separation of the hydrogenolysis product into two fractions, a first fraction consisting largely of components having boiling points equal to glycerin and above, and a second fraction consisting largely of components having boiling points below glycerin. The glycerin rich first fraction contained a mixture of glycerin with significant amounts of 1,2,4-butanetriol, tetritols, and hexitols, and lesser amounts of lower boiling materials, including 1,2,3-butanetriol and ethylene glycol.

The first fraction was then distilled in a Tetritol Column. The Tetritol Column was equipped with distillation trays and was operated under a pressure in the top portion of the column of about 100 mm. of Hg absolute and at a temperature in the bottom portion of the column of up to 230° C. Open steam was fed into the bottom portion of the column to maintain sufficient bottom pressure. The top portion of the column was used to separate the glycerin-rich vapors from steam. The reflux ratio of the Tetritol Column was adjusted so that the first fraction from the Splitter was separated into two subfractions. The first subfraction, consisting largely of components having boiling points close to that of glycerin, contained glycerin and minor amounts of ethylene glycol, 1,2,3-butanetriol, 1,2,4-butanetriol, tetritols and other materials. The second subfraction consisted largely of materials having boiling points above that of glycerin and was cycled back to the hydrogenolysis process area and refed into the process as a hydrogenolysis feed material.

The first subfraction from the Tetritol Column was then treated to substantially rid the mixture from materials having boiling points near glycerin by adding about 0.1% sulfuric acid and heating the acidified mixture at a temperature of about 145° C. for about 4 hours at 10 mm. Hg pressure. Generally from about 0.01% to about 2.5% by weight of sulfuric acid is suitable for the step and the mixture may be heated for a period of from 1 to 12 hours, at a temperature of between about 130° C. and about 180° C. The pressure during the acid treatment may be atmospheric or sub-atmospheric. The only lower limit on the pressure to be employed is the natural one, that of avoidance of glycerin loss by vaporization. Preferably the pressure is maintained at least 5 mm. Hg above the vapor pressure of glycerin at the treating temperature. The acidification and heating steps were carried out in a batchwise process. The acidified product was then diluted with sufficient water to dilute the glycerin concentration to 90% or less, to give a thinned liquid suited for passage through an ion exchange column. The mixture was allowed to cool to about 40° C. and then passed through an anion exchange medium.

The anion exchanged product was then fed into a First Glycerin Column. The First Glycerin Column separates lighter boiling materials from glycerin. The column was equipped with distillation trays and operated under a pressure in the top portion of the column of about 100 mm. of Hg absolute and at a temperature in the bottom portion of the column of up to 230° C. Open steam was introduced in the bottom portion of the column to maintain sufficient bottom pressure. The top portion of the column was used to separate the polyol-rich vapors from steam. The reflux ratio of the first glycerin column was adjusted to obtain a first stream, rich in glycerin, which contained less than 0.02% of any single lighter component and a second stream containing a major amount of 1,2,3-butanetriol with minor amounts of glycerin, ethylene glycol, other polyols, and acid reaction products was recovered as a portion of the methyl glycerin fraction product.

The first stream was treated by distillation in a Second Glycerin Column. The Second Glycerin Column contained distillation trays and was operated under a pressure in the top portion of the column of about 100 mm. of Hg absolute and at a temperature in the bottom portion of the column of up to 230° C. Open steam was fed into the bottom portion of the column to maintain sufficient bottoms pressure. The top portion of the column was used to separate the glycerin-rich vapors from steam. The reflux ratio of the Second Glycerin Column was adjusted to separate a first, or product, substream containing about 99.94% glycerin with about 0.02% 1,2,3-butanetriol and about 0.04% 1,2,4-butanetriol and a second substream principally containing materials having boiling points above that of glycerin. The second substream was cycled to the Tetritol Column and again distilled. The first substream was recovered as a high purity glycerin product.

The second fraction separated at the Splitter, which contained the major amount of materials having boiling points below glycerin, principally 2,3-butanediol, propyleneglycol, 1,2-butanediol, ethylene glycol, with minor amounts of 1,2,3-butanetriol, glycerin and other polyols having boiling points between glycerin and ethylene glycol, and was then treated by distillation in a Mixed Glycols Column. The Mixed Glycols Column was equipped with distillation trays and operated at temperatures up to 215° C. at approximately atmospheric pressure, The Mixed Glycols Column separated the material received from the Splitter into two portions. The first portion contained a high percent of propylene glycol with lower concentrations of ethylene glycol, 1,2-butanediol and 2,3 butanediol. This portion was recovered as a mixed glycols product.

The second portion, rich in ethylene glycol, was subjected to a distillation in the Ethylene Glycol Column. The Ethylene Glycol Column was equipped with distillation trays and was operated at temperatures in the bottom portion of the column of up to 230° C. and under a pressure in the top portion of the column of about 275 mm. Hg absolute. The reflux ratio of the Ethylene Glycol Column was adjusted to separate the feed material into two subportions. The first subportion consisted essentially of ethylene glycol containing about 1.1% by weight total organic impurities. This subportion was recovered as an ethylene glycol product. The second subportion principally containing a 1,2,3-butanetriol glycerin, ethylene glycol and other polyols boiling between glycerin and ethylene glycol was recovered and added to the second stream from the First Glycerin Column as a portion of the methyl glycerin fraction.

The hydrogenolysis product fed into the separation process of the present invention may vary in polyol kind and content over a wide range. However, the present separation process is operative to selectively separate useful components from such vicarious mixture.

What is claimed is:

1. A process for recovering glycerin from a reaction mixture resulting from the catalytic hydrogenolysis of saccharidic material and containing 2,3-butanediol, propylene glycol, 1,2-butanediol, ethylene glycol, 1,2,3-butanetriol, glycerin, 1,2,4-butanetriol, tetritols and hexitols comprising the steps of subjecting said mixture to a first distillation to separate from the said mixture a fraction of said mixture made up principally of components having boiling points equal to and above that of glycerin and containing glycerin, 1,2,4-butanetriol, tetritols, hexitols and lesser amounts of 1,2,3-butanetriol and ethylene glycol, subjecting said fraction to a second distillation to separate from said fraction a subfraction made up principally of components having boiling points equal to and below that of glycerin and containing glycerin and minor amounts of ethylene glycol and 1,2,3-butanetriol, subjecting said subfraction to a third distillation to separate a substream made up principally of glycerin from a second substream made up principally of components having boiling points below that of glycerin.

2. A process for recovering glycerin from a reaction mixture resulting from the catalytic hydrogenolysis of propylene glycol, 1,2-butanediol, ethylene glycol, 1,2,3-butanetriol glycerin, 1,2,4-butanetriol, tetritols and hexitols comprising the steps of subjecting said mixture to a first distillation to remove water from said mixture, subjecting the remainder of said mixture to a second distillation to separate a portion of said remainder made up principally of components having boiling points equal to and above that of glycerin and containing glycerin, 1,2,4-butanetriol, tetritols, and hexitols and lesser amounts of 1,2,3-butanetriol and ethylene glycol from the said remainder, subjecting said portion obtained in said second distillation step to a third distillation and to separate from said portion a portion made up principally of components having boiling points equal to and below that of glycerin and containing glycerin and minor amounts of ethylene glycol and 1,2,3-butanetriol, subjecting said last separated portion to a fourth distillation to separate a portion made up principally of glycerin from a second portion made up principally of components having boiling points below that of glycerin.

3. A process for recovering glycerin from a reaction mixture resulting from the catalytic hydrogenolysis of saccharidic material and containing 2,3-butanediol, propylene glycol, 1,2-butanediol, ethylene glycol, 1,2,3-butanetriol, glycerin, 1,2,4-butanetriol, tetritols and hexitols comprising the steps of subjecting said mixture to a first distillation to separate from said mixture a portion of said mixture made up principally of components having boiling points equal to and above that of glycerin and containing glycerin, 1,2,4-butanetriol, tetritols and hexitols from the said mixture, subjecting said separated portion to a second distillation to separate from said separated portion a portion made up principally of components having boiling points equal to and below that of glycerin and containing glycerin, and minor amounts of ethylene glycol, 1,2,3-butanetriol, 1,2,4-butanetriol and tetritols, subjecting said last separated portion to a third distillation to separate from said last separated portion a portion made up principally of components having boiling points equal to and above glycerin, and subjecting said last separated portion to a fourth distillation to separate a first subportion made up principally of glycerin from a second subportion made up principally of components having boiling points above glycerin.

4. The process of claim 3 wherein
said reaction mixture resulting from the catalytic hydrogenolysis is subjected to a preliminary distillation to remove water and other materials having boiling points equal to and below water prior to said first distillation.

5. A process for recovering glycerin from a reaction mixture resulting from the catalytic hydrogenolysis of saccharidic material and containing water, 2,3-butanediol, propylene glycol, 1,2-butanediol, ethylene glycol, 1,2,3-butanetriol, glycerin, 1,2,4-butanetriol, tetritols and hexitols comprising the steps of subjecting said mixture to a first distillation to remove water from said mixture, subjecting the remainder of said mixture to a second distillation to separate a portion of said remainder made up principally of components having boiling points equal to and above that of glycerin and containing glycerin, 1,2,4-butanetriol, tetritols, hexitols, and lesser amounts of 1,2,3-butanetriol and ethylene glycol from said remainder, subjecting said portion separated in said second distillation step to a third distillation to separate from said portion a portion made up principally of components having boiling points equal to and below that of glycerin and containing glycerin and minor amounts of ethylene glycol, 1,2,3-butanetriol, 1,2,4-butanetriol and tetritols, condensing said last separated portion, adding from about 0.01% to about 2.5% by weight of sulfuric acid to said condensed portion and heating said portion under vacuum for a period of from 1 to 12 hours to convert compounds other than glycerin in said portion to a more volatile form, neutralizing said acidified portion, subjecting said neutralized portion to a fourth distillation to separate from said portion a portion made up principally of components having boiling points equal to and above glycerin, and subjecting said last separated portion to a fifth distillation to separate a volatilized first subportion made up principally of glycerin from a second subportion made up principally of components having boiling points above glycerin.

6. A process for separating and recovering useful components from a reaction mixture resulting from the catalytic hydrogenolysis of saccharidic material which mixture includes 2,3-butanediol, propylene glycol, 1,2-butanediol, ethylene glycol, 1,2,3-butanetriol, glycerin, 1,2,4-butanetriol, tetritols and hexitols comprising the steps of subjecting said mixture to a first distillation to separate the components of said mixture into a first fraction made up principally of components having a boiling point equal to and above glycerin and containing 2,3-butanediol, propylene glycol, 1,2-butanediol, ethylene glycol and minor amounts of 1,2,3-butanetriol and glycerin and a second fraction made up principally of components having boiling points below glycerin and containing 2,3-butanediol, propylene glycol, 1,2-butanediol, ethylene glycol and 1,2,3-butanetriol and minor amounts of 1,2,3-butanetriol and glycerin, subjecting said first fraction to a second distillation to separate a first subfraction made up principally of components having boiling points equal to and below that of glycerin and containing glycerin and minor amounts of ethylene glycol, 1,2,3-butanetriol, 1,2,4-butanetriol and tetritols and a second subfraction made up principally of components having boiling points above that of glycerin, subjecting the first subfraction to a third distillation to separate a first stream principally containing components having boiling points equal to and above that of glycerin and a second stream principally containing components having boiling points below glycerin, subjecting said first stream to a fourth distillation to separate a first substream made up principally of glycerin and a second substream made up principally of components having boiling points above glycerin, subjecting said second fraction obtained from said first distillation step to distillation to separate a first portion principally made up of components having a boiling point below that of ethylene glycol and containing propylene glycol and lower concentrations of ethylene glycol, 1,2-butanediol and 2,3-butanediol, and a second portion principally made up of components having boiling points equal to or above that of ethylene glycol, subjecting said second portion to a distillation to separate a product containing principally ethylene glycol and residual product made up principally of materials having boiling points above ethylene glycol.

7. The process described in claim 6 wherein the second substream obtained from said fourth distillation step is removed and fed to said second distillation step.

8. The process of claim 6 wherein said reaction mixture resulting from the catalytic hydrogenolysis is subjected to a preliminary distillation to remove water and other materials having a boiling point equal to or below water prior to said first distillation.

9. The process of claim 6 wherein the said first subfraction from said second distillation is heated to a temperature of between about 130° C. and about 180° C., treated with from 0.01% to about 2.5% by weight of sulfuric acid for a period of from 1 to 12 hours, and the acidified mixture neutralized prior to further distillation of said subfraction.

References Cited by the Examiner

UNITED STATES PATENTS

| | | |
|---|---|---|
| 251,992 | 1/1882 | Battershall. |
| 2,381,055 | 8/1945 | Hoyt. |
| 2,636,847 | 4/1953 | Hamner et al. _____ 203—85 |
| 2,755,623 | 12/1956 | Bell _____ 260—637 |
| 2,960,447 | 11/1960 | Anderson et al. _____ 203—34 |
| 2,977,291 | 3/1961 | Hartmann _____ 203—35 |
| 3,198,843 | 8/1965 | Barker. |

NORMAN YUDKOFF, *Primary Examiner.*

WILBUR L. BASCOMB, JR., *Examiner.*

UNITED STATES PATENT OFFICE
CERTIFICATE OF CORRECTION

Patent No. 3,278,398                              October 11, 1966

James A. Finneran et al.

It is hereby certified that error appears in the above numbered patent requiring correction and that the said Letters Patent should read as corrected below.

Column 2, line 14, after "stream" insert -- made --; column 7, line 7, after "of" insert -- saccharidic material and containing water, 2,3-butanediol, --.

Signed and sealed this 28th day of November 1967.

(SEAL)
Attest:

Edward M. Fletcher, Jr.
Attesting Officer

EDWARD J. BRENNER
Commissioner of Patents